UNITED STATES PATENT OFFICE.

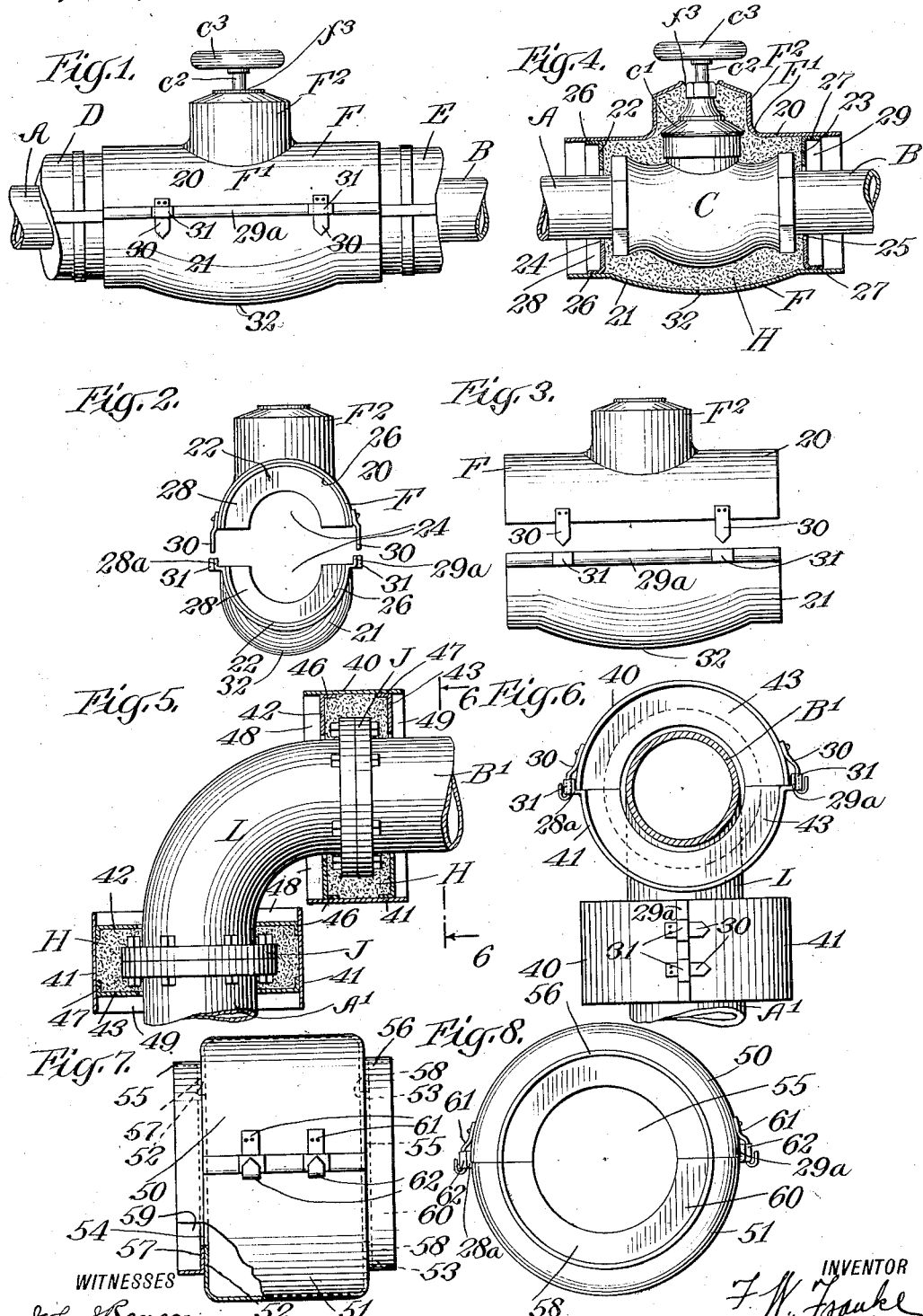

FREDERICK W. FRANKE, OF JAMAICA, NEW YORK, ASSIGNOR OF ONE-THIRD TO MATTHEW P. VAN NESS AND ONE-THIRD TO ERNEST A. WEIDLICH, JR., BOTH OF JAMAICA, NEW YORK.

REMOVABLE VALVE-INSULATION CASE.

1,108,840.  Specification of Letters Patent.  Patented Aug. 25, 1914.

Application filed October 19, 1912.  Serial No. 726,597.

*To all whom it may concern:*

Be it known that I, FREDERICK W. FRANKE, a subject of the Emperor of Germany, residing at Jamaica, in the county of Queens and State of New York, have invented certain new and useful Improvements in Removable Valve-Insulation Casings, of which the following is a full, clear, and exact description.

This invention relates to improvements in valve and flange covering, and one of the objects of the invention is to construct such a covering that it may be readily and quickly applied to a valve or flange located in a pipe or line of pipe used for heating, refrigerating, or for other purposes, and may be readily and quickly removed without disturbing or destroying the adjoining cover.

Another object of the invention is to construct such a casing that it will effectively prevent radiation of either heat or cold in the valve or flange.

Another object of the invention is to construct such a casing at small cost.

Other objects will appear from the hereinafter description.

The invention will be clearly understood from the following description taken in connection with the accompanying drawings, which form a part of this specification.

Referring to the drawings, in which the same reference character indicates the same part in the several views, Figure 1 is a side elevation of the invention applied to a valve located in a line of pipe. Fig. 2 is an end view of the casing, the two members of which it is preferably made being shown slightly separated. Fig. 3 is a side elevation of Fig. 2; Fig. 4 is a view in section of the casing applied to a valve; Fig. 5 is a sectional view of the casing applied to flanges in a line of pipe; Fig. 6 is a side elevation of the same looking in the direction of the arrow in Fig. 5; Fig. 7 is a side elevation of a modified construction of the casing; and Fig. 8 is an end view of the same.

The casing is preferably formed of two separable parts, which can be quickly and readily fastened together around a pipe or flange, or removed therefrom.

Referring specifically to Figs. 1 to 4 inclusive, the part marked A on the drawing represents one end of a pipe and B the adjacent end of another pipe. C is a globe valve to which the said ends of the pipe are attached. D is an asbestos covering around the pipe A, and E is an asbestos covering around the end of the pipe B. The insulated casing which forms this invention is marked F. It consists of two halves, 20 and 21, which when put together form a substantial cylindrical part, F′, which surrounds the body of the valve; and two end members, 22 and 23, which have openings 24 and 25, through which the ends of the pipes A and B project into the chambers between said members when the casing is in place. The upper half 20 of the cylindrical member F′ is provided with or formed into a dome, $F^2$, which fits over the cover, $c'$, and surrounds the stem $c^2$ of the valve, the upper end of the dome being provided with an opening, $f^3$, to receive the valve stem. The ends 22 and 23 are provided with outwardly extending flanges, 26 and 27, which are secured to the ends of the cylindrical member, F′, by riveting, or otherwise, and which form pockets 28 and 29 to receive the ends of the asbestos coverings, D and E, surrounding respectively the ends of the pipes A and B. The longitudinal edges of one of the halves 20 or 21 of the cylindrical member F′, as here shown the lower one, may be offset at $28^a$ and $29^a$ to receive the respective longitudinal members of the upper half of said member to form a seat and tight joint between the said two halves. The two parts of the casing may be secured together by any suitable means. As illustrated, this means consists of tongues secured to the upper half 20, and which fit into keepers 31 stamped out of the lower half 21. The latter half may be provided with one or more drain openings 32, through which may pass any water that collects in the casing, and by which any leakage in the valve or coupling may be detected.

When the casing as described is to be used, asbestos H, either dry or dampened, is placed in the lower half 21. This half of the casing is then placed in position around the valve and the ends A and B of the pipes. The upper half 20 is then placed in position, the handwheel $C^3$ of the valve being removed to permit this half to be fitted around the valve, and after it is fitted the handwheel is placed in position. The asbestos may be placed in the upper half of the casing, either before or after the said casing is put in position. The two halves of the casing are held in position by the tongues 30 passing through the members 31, the free ends of the said tongues being turned or bent over to hold the said parts securely together. When the casing is to be removed for packing the valves or joints, or for any other purpose, the valve can be quickly and easily got at by removing the handwheel $C^3$, straightening out the tongues 30, and lifting the upper half off of the valve. The lower half can then be removed. It is apparent that the valve can be got at quickly and readily, without disturbing the asbestos covering D and E, and by this improved casing an efficient and economical packing is provided for the valve itself.

In Figs. 5 and 6 I have shown the casing constructed and adapted to fit around the flanges J, secured to the end of the pipes A' and B', and an elbow L. I have indicated the two halves of the casing for the flange by the reference characters 40 and 41. In this construction the ends 42 and 43 of the casing are provided with inturned flanges 46 and 47, instead of outturned, as in the construction shown in the preceding figures, the pockets for the asbestos covering surrounding the pipe A' B' and the elbow L, being marked respectively 48 and 49. The two halves of this particular casing are secured together by tongues 30 and corresponding members 31, as in the preceding construction.

In Figs. 7 and 8 I have shown a slightly modified construction. In this construction the two halves of the casing are marked 50 and 51 respectively, and the ends of these two halves are inturned to form the flanges 52 and 53, leaving the openings 54 and 55 for the end of the pipe secured to the said flanges 52 and 53. On the outside thereof are collars or rings, 55 and 56, which have inturned flanges 57 and 58, which are secured to the flanges 52 and 58, which are secured to the flanges 52 and 53, just referred to. These collars with the inturned flanges form or provide pockets 59 and 60, to receive the asbestos packing surrounding the ends of the pipe which passes through the openings 54 and 55 in this casing. The two halves of the casing are preferably held together by tongues 61 on the upper half of the casing, which extends into the members 62 in the lower half of the casing.

In the construction shown by Figs. 5 to 8, inclusive, certain of the longitudinal edges of the halves forming the casings may be offset to receive the adjacent longitudinal edges of the other half, as described in reference to the construction shown by the first five figures of the drawing.

While I have described the parts as being fastened together by rivets, it is apparent that they may be fastened together by brazing, welding, or in any other suitable manner, and in each instance the two halves of the casing of either construction may be held together and fastened around the pipe in any suitable manner.

Of course, in some cases the asbestos filling or packing inside the casing may be dispensed with; and in this case suitable means may be provided inside of each half of the casing to suitably space the casing from the valve or flange which it surrounds.

The casing is preferably made out of sheet metal, so that the parts may be quickly and cheaply stamped or formed to shape, and the parts quickly and economically put together.

Having described my invention, what I claim as new and desire to secure by Letters Patent is—

1. A casing of the class described formed of a pair of sections divided from each other longitudinally approximately along the median line of the casing, each of said sections comprising an outer wall and internal solid partitions, said partitions having recesses to receive the pipe and being spaced from each other and set back from the extremities of the casing, whereby outwardly open pockets at the ends of the casing and a single chamber between said pockets are provided, the chamber being adapted to receive coupling packing, said chamber being independent of and separate from the adjoining pockets which latter are adapted to receive pipe covering, said casing also having means for securing its sections together, said means being adapted to permit the casing to be readily opened along the line of separation of the sections.

2. A casing of the class described, consisting of a cylindrical member and end members secured to the cylindrical member and spaced inwardly from its ends to form the outwardly opening pockets, and a central separate and independent chamber, each end member being provided with an opening therein for the pipe, the casing being divided approximately along its median line whereby it is formed of two approximately equal sections, one of the sections being provided with a dome, with an opening therein, and the other section being provided with a drain opening, means for securing the two sections together, the central chamber being adapted to receive an insulating material and the pockets to receive the pipe covering.

In witness whereof I have hereunto set my hand at Jamaica, city and State of New York, this 1st day of October, 1912.

FREDERICK W. FRANKE.

In presence of—
MATTHEW R. VAN NESS,
ERNEST A. WIEDLICH, Jr.